United States Patent
Gamon et al.

(10) Patent No.: US 8,630,972 B2
(45) Date of Patent: Jan. 14, 2014

(54) PROVIDING CONTEXT FOR WEB ARTICLES

(75) Inventors: Michael Gamon, Seattle, WA (US); Sumit Basu, Seattle, WA (US); Dmitriy A. Belenko, Redmond, WA (US); Danyel A Fisher, Seattle, WA (US); Arnd C. Konig, Redmond, WA (US); Matthew F. Hurst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 12/143,765

(22) Filed: Jun. 21, 2008

(65) Prior Publication Data

US 2009/0319449 A1   Dec. 24, 2009

(51) Int. Cl.
G06F 17/00 (2006.01)
G06N 7/00 (2006.01)
G06N 7/08 (2006.01)

(52) U.S. Cl.
USPC .......................................................... 706/58

(58) Field of Classification Search
USPC .......................................................... 706/58
See application file for complete search history.

(56) References Cited

U.S. PATENT DOCUMENTS

| | | | | |
|---|---|---|---|---|
| 6,564,257 B1 * | 5/2003 | Emens et al. | ................. | 709/219 |
| 6,782,423 B1 * | 8/2004 | Nakayama et al. | ............ | 709/224 |
| 7,260,774 B2 * | 8/2007 | Lambert et al. | ............... | 715/234 |
| 7,720,835 B2 * | 5/2010 | Ward et al. | ..................... | 707/710 |
| 2003/0172066 A1 * | 9/2003 | Cooper et al. | .................... | 707/7 |
| 2004/0143580 A1 * | 7/2004 | Chi et al. | ..................... | 707/100 |
| 2004/0199498 A1 * | 10/2004 | Kapur et al. | ..................... | 707/3 |
| 2006/0004691 A1 | 1/2006 | Sifry | | |
| 2006/0085766 A1 * | 4/2006 | Dominowska et al. | ....... | 715/854 |
| 2006/0200483 A1 | 9/2006 | Gorzela et al. | | |
| 2006/0265383 A1 * | 11/2006 | Pezaris et al. | ................... | 707/10 |
| 2006/0271859 A1 | 11/2006 | Gorzela | | |
| 2006/0287989 A1 | 12/2006 | Glance | | |
| 2006/0294124 A1 * | 12/2006 | Cho | ............................. | 707/101 |
| 2007/0038646 A1 | 2/2007 | Thota | | |
| 2007/0078854 A1 | 4/2007 | Naam et al. | | |
| 2007/0100875 A1 | 5/2007 | Chi et al. | | |
| 2007/0106627 A1 | 5/2007 | Srivastava et al. | | |
| 2007/0174343 A1 | 7/2007 | Fortuna | | |
| 2007/0192717 A1 | 8/2007 | Gong et al. | | |
| 2007/0220426 A1 * | 9/2007 | Mueller et al. | ................ | 715/532 |
| 2007/0255755 A1 * | 11/2007 | Zhang et al. | ............... | 707/104.1 |

(Continued)

OTHER PUBLICATIONS

Relative change and difference, Wikipedia [online], [retrieved on Jun. 13, 2011]. Retrieved from the Internet <URL:http://en.wikipedia.org/wiki/percent_difference>.*

(Continued)

Primary Examiner — Kakali Chaki
Assistant Examiner — Peter Coughlan
(74) Attorney, Agent, or Firm — Microsoft Corporation

(57) ABSTRACT

An overwhelming number of articles are available everyday via the internet. Unfortunately, it is impossible to peruse more than a handful, and it is difficult to ascertain an article's social context. The techniques disclosed herein address this problem by harnessing implicit and explicit contextual information from social media. By extracting text surrounding a hyperlink to an article in a post and assessing the article as a function of content surrounding the hyperlink, an article's social context is determined and presented. Additionally, articles that are sufficiently similar in content may be grouped to establish a many-to-one relationship between posts and an article, creating a more accurate assessment.

20 Claims, 6 Drawing Sheets

(56) References Cited

U.S. PATENT DOCUMENTS

| | | | |
|---|---|---|---|
| 2007/0294281 A1 | 12/2007 | Ward et al. | |
| 2008/0005064 A1* | 1/2008 | Sarukkai | 707/3 |
| 2008/0005137 A1* | 1/2008 | Surendran et al. | 707/101 |
| 2008/0010056 A1* | 1/2008 | Zhou et al. | 704/8 |
| 2008/0091650 A1* | 4/2008 | Fontoura et al. | 707/3 |

OTHER PUBLICATIONS

Automatic identification of sentiment vocabulary: exploiting low association with known sentiment terms: Gamon, ACL-05 workshop, 2005.*

Herring, et al., "Conversations in the Blogosphere: An Analysis From the Bottom Up", retrieved at << http://www.blogninja.com/hicss05.blogconv.pdf >>. 2005, Proceedings of the Thirty-Eighth Hawai'i International Conference on System Sciences (HICSS-38). Los Alamitos: IEEE, pp. 1-11.

Marlow; Cameron, "Audience, structure and authority in the weblog community", retrieved at << http://alumni.media.mit.edu/~cameron/cv/pubs/04-01.pdf >>, pp. 1-9.

Drezner, et al., "The Power and Politics of Blogs", Jul. 2004, retrieved at << http://www.utsc.utoronto.ca/~farrell/blogpaperfinal.pdf >>, pp. 1-27.

Adamic, et al., "The Political Blogosphere and the 2004 U.S. Election: Divided They Blog", Mar. 4, 2005, retrieved at << http://www.blogpulse.com/papers/2005/AdamicGlanceBlogWWW.pdf >>, pp. 1-16.

Adar, et al., "Tracking information epidemics in blogspace", Proceedings of the 2005 IEEE/WIC/ACM International Conference on Web Intelligence (WI'05), 2005, IEEE, retrieved at << http://ieeexplore.ieee.org/iel5/10179/32502/01517844.pdf?arnumber=1517844 >>, pp. 8.

Balog, et al., "Decomposing Bloggers' Moods", retrieved at << http://www.blogpulse.com/www2006-workshop/papers/wwe2006-decomposing-moods.pdf >>, May 22-26, 200, pp. 6.

Bowman, et al., "Reasoning about naming systems", ACM Transactions on Programming Languages and Systems, vol. 15. No. 5, Nov. 1993, retrieved at << http://doi.acm.org/10.1145/161468.16147-1. >>, pp. 795-825.

Brown, et al., "A widget framework for augmented interaction in SCAPE", 2003, ACM, vol. 5, Issue 2, retrieved at << http://portal.acm.org/citation.cfm?id=964696.964697&coll=portal&dl=ACM&type=series&idx=SERIES301 >>, pp. 1-10.

Burges, et al., "Learning to Rank using Gradient Descent", retrieved at << http://research.microsoft.com/~cburges/papers/ICML_ranking.pdf >>, pp. 8.

Dunning; TED, "Accurate Methods for the Statistics of Surprise and Coincidence", Jan. 7, 1993, retrieved at << http://www.comp.lancs.ac.uk/ucrel/papers/tedstats.pdf >>, pp. 18.

Fetterly, et al., "Detecting Phrase-Level Duplication on the World Wide Web", 2005, ACM, retrieved at << http://research.microsoft.com/research/sv/sv-pubs/sigir2005.pdf >>, pp. 8.

Forman, et al., "An Extensive Empirical Study of Feature Selection Metrics for Text Classification", retrieved at << http://jmlr.csail.mit.edu/papers/volume3/forman03a/forman03a_full.pdf >>, Journal of Machine Learning Research 3, 2003, pp. 27.

Frohlich, et al., "The Cubic Mouse a New Device for Three-Dimensional Input", Proceedings ACM CHI 2000, Apr. 2000, retrieved at << http://www.uni-weimar.de/cms/fileadmin/medien/vr/documents/publications/CHI2000-CubicMouse.pdf >>, pp. 6.

Glance, et al., "BlogPulse: Automated Trend Discovery for Weblogs", retrieved at << http://www.blogpulse.com/papers/www/2004glance.pdf >>, pp. 8.

Godbole, et al., "LargeScale Sentiment Analysis for News and Blogs", retrieved at << http://www.cs.sunysb.edu/~skiena/lydia/sentiment.pdf >>, pp. 4.

Huffman, et al., "Multiple-Signal Duplicate Detection for Search Evaluation", SIGIR 2007 Proceedings, retrieved at << http://portal.acm.org/citation.cfm?id=1277741.1277782\ >>, pp. 223-230.

Kim, et al., "Determining the Sentiment of Opinions", Proceedings of the COLING conference, Geneva, 2004, retrieved at << http://www.isi.edu/natural-language/people/hovy/papers/04Coling-opinion-valences.pdf >>, pp. 1-8.

McCreight; M. Edward, "A Space-Economical Suffix Tree Construction Algorithm", Journal of the Association for Computing Machinery, vol. 23, No. 2, Apr. 1976, retrieved at << http://portal.acm.org/citation.cfm?doid=321941.321946 >>, pp. 262-272.

Mishne; Gilad, "Experiments with Mood Classification in Blog Posts", 2005, retrieved at << http://staff.science.uva.nl/~gilad/pubs/style2005-blogmoods.pdf >>, pp. 8.

Mishne, et al., "MoodViews: Tracking and Searching MoodAnnotated Blog Posts", retrieved at << http://staff.science.uva.nl/~mdr/Publications/Files/icwsm2007-moodviews.pdf >>, pp. 2.

"World News, Mapped", retrieved at << http://buzztracker.org. >>, Pages.

Pang, et al., "Thumbs up? Sentiment Classification using Machine Learning Techniques", retrieved at << http://www.cs.cornell.edu/home/llee/papers/sentiment.pdf >>, pp. 8.

Schleimer, et al., "Winnowing: Local Algorithms for Document Fingerprinting", retrieved at << http://theory.stanford.edu/~aiken/publications/papers/sigmod03.pdf >>, pp. 10.

Turney, et al., "Thumbs Up or Thumbs Down? Semantic Orientation Applied to Unsupervised Classification of Reviews", Proceedings of the 40th Annual Meeting of the Association for Computational Linguistics (ACL), Philadelphia, Jul. 2002, retrieved at << http://acl.ldc.upenn.edu/P/P02/P02-1053.pdf >>, pp. 8.

Wiebe, et al., "Learning Subjective Language", retrieved at << http://portal.acm.org/citation.cfm?id=1105596.1105598 >>, 2004 Association for Computational Linguistics, vol. 30, No. 3, pp. 32.

Yamamoto, et al., "Using Suffix Arrays to Compute Term Frequency and Document Frequency for All Substrings in a Corpus", retrieved at << http://portal.acm.org/citation.cfm?id=972779 >>, vol. 27, No. 1, pp. 30.

Yu, et al., "A comparison of MC/DC, MUMCUT and several other coverage criteria for logical decisions", retrieved at << www.citeulike.org/user/embersp/article/1195428 >>, The Journal of Systems and Software 79, 2006, pp. 577-590.

Zuckerman; Ethan"Global Attention Profiles—A working paper: First steps towards a quantitative approach to the study of media attention", retrieved at << http://cyber.law.harvard.edu/node/372 >>, pp. 27.

* cited by examiner

PROVIDING CONTEXT FOR WEB ARTICLES

BACKGROUND

Today, the World-Wide Web makes it easy for people to access articles from a multitude of sources. An overwhelming number of new articles are available everyday via the Internet. Unfortunately, a reader may peruse only a handful of articles, and deciding which articles are most valuable to that reader in helping understand the story is a difficult task. To simplify the selection process, many people rely on a blog or several blogs for guidance. However, by doing this, they are exposing themselves to that particular blog's editorial biases.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more techniques are disclosed that assess an article as a function of content surrounding hyperlinks that point to an article (e.g. a news article) found in one or more posts (e.g., blog posts, tweets, etc.). In one example, the emotional charge an article creates is assessed according to language surrounding the hyperlinks that points to an article in one or more posts. The content surrounding the hyperlinks is assessed according to some predetermined criteria (e.g., emotional charge). Since it is likely that the content surrounding the hyperlink is regarding the article, the assessment of the regions of content surrounding said hyperlinks serves as the basis for the article's assessment. For example, if only one hyperlink points to an article, and the assessment of the content surrounding the hyperlink is determined to be very emotionally charged, the article will be assessed as being very emotionally charged. However, using the same example, if another post cites the same article (e.g., contains a hyperlink to the same article) and the content surrounding the hyperlink in the new post is assessed as not emotionally charged, the article's assessment may be aggregated using the assessments of both posts (e.g., the article may be assessed as being slightly emotional charged).

Additionally, hyperlinks that point to different articles that are sufficiently similar in content may be modified to point to a single article if the articles are judged to contain the sufficiently similar content via some method (e.g., if the counts of sufficiently long term sequences in the different articles are the same). In one example, two local news agencies (e.g., a local newspaper in one city and a local newspaper in a different city) acquire an article from a national news agency. The two local news agencies modify the article (e.g., to language more appropriate for their readers) they acquired from the national news agency and repost the modified article, still comprising substantially the same content, on their website, for example. Then two blog posts, for example, are posted, with hyperlinks to different news agency but relating to a story originally published by the national news agency. If enough term sequences are common amongst the two articles, the technique disclosed herein may detect that those two articles are sufficiently similar in content (e.g., they are duplicate articles). This technique may help ensure that multiple hyperlinks point to the same article (e.g., improving the accuracy of the assessment and improving the quality of context provided for that article).

The technique disclosed herein improves a user's ability to search for and select an article by providing a user with some context surrounding the article. In one example, a user may find the most popular articles discussed, the most articles discussed in a particular category, and the articles most emotionally discussed in a particular category. Additionally, rather than relying on a particular site for articles and/or a particular blog, for example, to provide context surrounding an article, a user is given a more objective means for evaluating which articles to read among the thousands posted every day.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 3 is an exemplary user interface for presenting the assessment of the posts related to the article once an indicator box is focused on.

DETAILED DESCRIPTION

Figure 1:
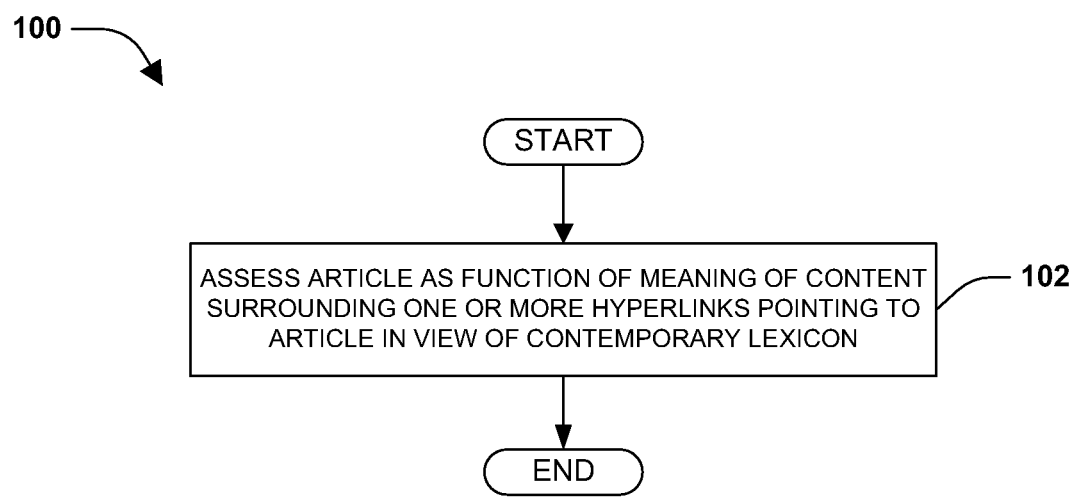
FIG. 1 is a flow chart illustrating an exemplary method of assessing an article.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Turning initially to FIG. 1, an exemplary methodology 100 is illustrated for making an assessment of an article. The assessment may provide some context surrounding the article and provide a user with some criteria to assist in selecting an appropriate article. In one example, the article is a news story and a post provides information such as: how popular the article is, who is reading it, and how people feel about the article.

At 102, an article is assessed as a function of meaning of content surrounding a hyperlink pointing to the article in view of contemporary lexicon or generally understood vernacular of the day. That is, the meaning of the words and language surrounding the hyperlink at the time they are used (e.g., fifteenth century (old English) is very different than modern/ contemporary English). It will be appreciated that the term "meaning" is used in a broad sense herein to describe or comprise, among other things, a level of context that a term connotes in present language and/or a definition of a term (e.g., the assessment may include, but does not require, a cognitive step). An assessment component, for example, may be implemented to assess one or more terms independently or may receive input (e.g., such as being trained to associate a particular term with a meaning, weight, etc.) that allows the content to be assessed. It will be appreciated that as a term's societal meaning changes, the assessment component may adjust to fit the contemporary understanding of the term. It will be appreciated that, unlike simple counting techniques, more than just the frequency of a term in the content surrounding the related hyperlink is examined in assessing the article. For example, if "very angry" appeared in the content surrounding a hyperlink, the article may be categorized as having a high emotional charge. In one example, the hyperlink is found in a post and a post writer's language provides the content used to assess (e.g., according to some predetermined criteria) the article. To assess the article, a particular number of terms (e.g., 30 terms) on one or both sides of the hyperlink are extracted and assessed. In one example, the terms are assessed by a Maximum Entropy classifier which produces binary output (e.g., 0 for a non-emotional article and 1 for an emotional article) and a confidence score indicating how confident it is with the binary output. Once the content surrounding the hyperlink pointing to the article is assessed, the article is assessed as a function of the assessment of the content surrounding the hyperlinks from all posts pointing to said article (e.g., aggregating the values produced by the Maximum Entropy classifier).

By way of example, content is acquired by monitoring social media (e.g., weblogs, usenet, microblogs, message board forums, etc.) and receiving feeds (e.g., including an XML data stream) from ping servers and syndication feed crawlers. The XML stream is parsed and the title, body, permalink URL, and timestamp are acquired for a post comprising a hyperlink and stored. To provide better performance, an in-memory queue, for example, is utilized to temporarily store posts coming through a feed when there are bursts of traffic and an offline queue is used to temporarily store information that is acquired but cannot be stored quickly enough. The post is assigned a social media identification tag that matches the post's permalink (e.g., contained on a whitelist). The social media identification tag allows the post to be classified according to some category (politically liberal, politically conservative, sports, celebrity gossip, etc.).

Once the post is acquired, HTML tags are removed and hyperlinks (e.g. URLs pointing a user to another page) are replaced with placeholders (e.g., numbered URL markers). In one example, the placeholder acts as a bookmark and a particular number of terms before and after the placeholder may be used to assess the article related to placeholder (e.g., the hyperlink). The hyperlinks are stored corresponding to their respective placeholder. Additionally, the hyperlinks are classified as either pointing to a site containing articles (e.g., in a database of sites that often contain articles pertaining to a particular category of interest) or pointing to some other social media, such as another blog, for example. Hyperlinks classified as pointing to something else may be used to provide more content for making an assessment. For example, the hyperlink may point to another post and the content of that post is extracted and assessed to provide more context for the article.

A hyperlink that points to a site containing articles is compared to URLs from articles already retrieved from the site. In one example, URL's of articles already retrieved are only stored for a predetermined time period (e.g., 1 day, 1 week, etc.) to ensure that new articles having the same URL are detected. For example, a URL for a page containing the editor's pick of the week and may have a different article weekly. If the hyperlink matches a URL from an article already retrieved, the hyperlink is paired with an identification tag assigned to the article already retrieved. If the hyperlink does not match a URL from an article already retrieved, the article related to the hyperlink is retrieved.

Additionally, the article related to the hyperlink is compared to other articles already retrieved to find sufficiently similar content (e.g., 85% of the terms in the article are the same as those that appear on an article already retrieved). In one example, an article from one news source is syndicated and appears on multiple other news sources. Since multiple posts might point to different sources (e.g., having different URLs) for the same article, articles with the same or sufficiently similar content might be retrieved multiple times. Articles are sufficiently similar in content when the ratio of the longest term sequence (e.g., the most words in a row) amongst two articles and the number of terms in the largest article exceeds some threshold, for example. Additionally, articles may be sufficiently similar in content, for example, if the fraction of terms that appear in two articles exceeds some threshold. If the article is sufficiently similar in content with an article already retrieved, the article is treated as a duplicated (e.g., it may be discarded). Additionally, the hyperlink that was paired with the article's identification tag gets updated with the identification tag assigned to the article already retrieved. In one example, the identification tag assigned to the article also gets paired with the URL from the recently retrieved article (e.g., so that the same article will not be retrieved when future hyperlinks point to the recently acquired article's URL). By pairing multiple hyperlinks to the same identification tag (e.g., the same article) a many-to-one relationship is established.

After an article and a post are paired, the article is assessed (e.g., according to some predetermined criteria) as a function of content surrounding the hyperlink. In one example, the article is assessed for the emotional charge of text surrounding a hyperlink in the post. A particular number of terms (e.g., 30 terms) on one or both sides of the placeholder are extracted and run through a classifier and/or another automatic method for assessing the content. The classifier assesses the terms, thereby assessing the content as it relates to the article and the article itself. If the article has been previously assessed (e.g., where an article had already been retrieved because of a hyperlink in another post that has previously been assessed) the article's assessment is aggregated (e.g., according the binary output of related posts, the confidence score of related posts, and the number of hyperlinks paired to the article). The content of a post may not be reassessed if it has already been assessed. It will be appreciated that other social media pointed to by other hyperlinks in the post may also be used to provide further assessment for the article.

A device (e.g., a serving computer) allows information to be retrieved from storage. For example, a web service may expose methods for retrieving the article, the related post(s), and the assessments. In one example, the web service may allow retrieval of the most linked-to news articles, the most linked-to news articles that contain a given keyword, and links for a given news article and category it is related to. Additionally, the web service may cache some information for a period of time so that repeated requests for this data does not generate excessive load on a storage component (e.g., when the data infrequently changes).

A user interface provides a user with the article and context surrounding the article (e.g., by displaying the assessment and the related post or posts). It will be appreciated that a category or categories (e.g., of blogs) may be chosen by default according to some predetermined criteria. It will also be appreciated that an article or articles and their respective assessments may be displayed by default according to some predetermined criteria. Additionally, a user may alter a default category(ies) and/or article(s) as a function of user input (e.g., selecting a different category, inputting a keyword relating to the desired article, etc.). In one example, the title of an article may represent the article, an indicator box may represent the post(s), and small boxes may represent the assessment. An article may be presented, for example, by selecting the title of the article. A user may focus on the indicator box and the title of the post(s), for example, related to the article may be presented. Where a title(s) of a post(s) is presented, small boxes may also be presented to represent the post's assessment, for example. Additionally, a user may select a post's title and the post may be presented, for example.

Figure 2:
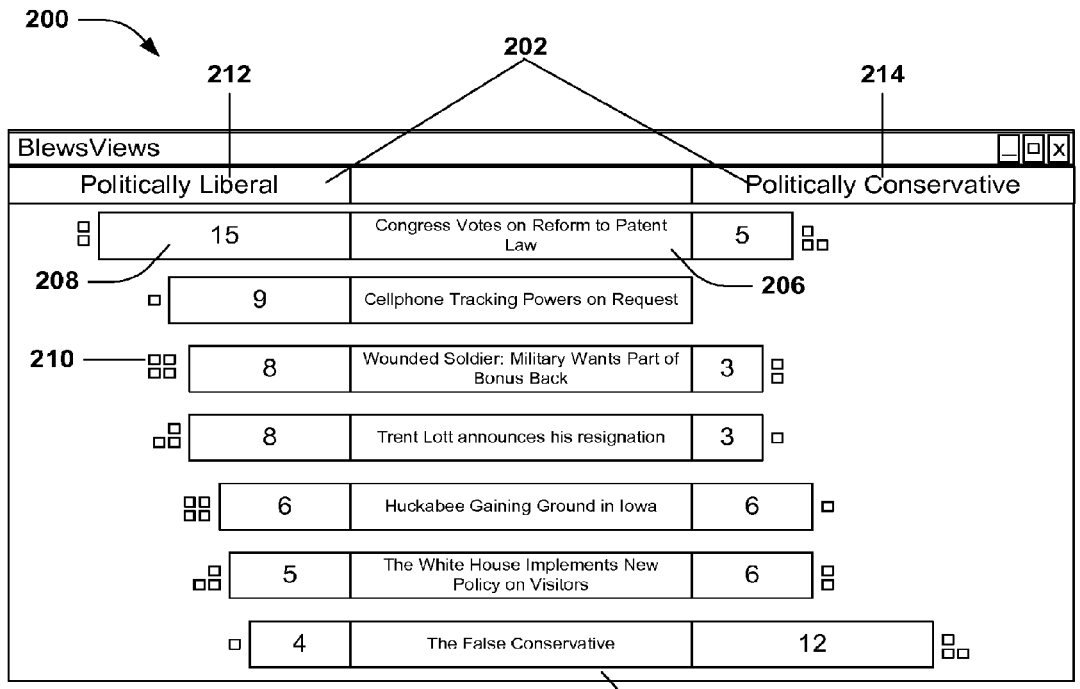
FIG. 2 is an exemplary user interface for presenting an assessment, article, and posts related to the article.
Figure 3:
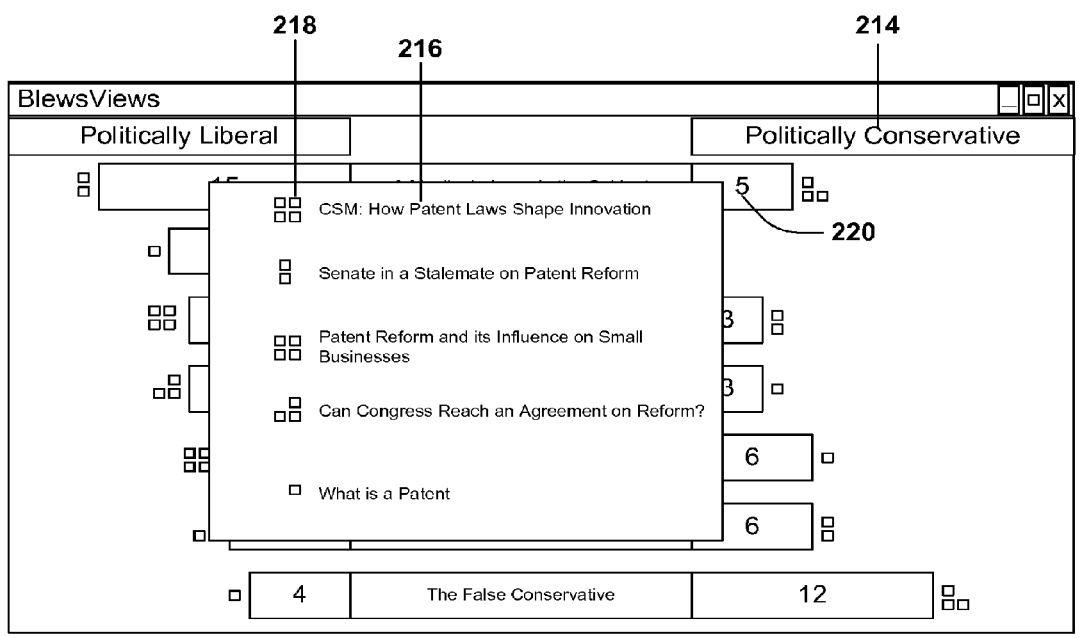

FIGS. 2-3 demonstrate at least some of the advantages of assessing an article as a function of content surrounding a hyperlink pointing to the article. More particularly, FIGS. 2-3 illustrate a display 200, two categories of posts 202, a list of articles 204 an article's title 206, an indicator box 208 representing posts related to that article, and small boxes 210 representing an article's assessment. In the illustrated example, the tab comprising articles in the "politically liberal" category 212 is focused on and articles are ordered according to how many posts comprise hyperlinks pointing (e.g., or being updated to point) to that article. It will be appreciated that articles 204 may be ordered according to some other figure of merit (e.g., the most emotionally charged articles in a given category) and displayed by default. An article's figure of merit might change (e.g., through user input) such that the order of the articles and/or the articles displayed might change. For example, if a user focused on the tab comprising articles in the "politically conservative" category 214, the articles displayed might be those that are most popular (e.g., based on the number of hyperlinks pointing to the article) in "politically conservative" blogs, for example. Additionally, more than one category may be displayed (e.g., by default or as a result of user input) and the articles displayed may be a function of some predetermined criteria and/or user input. In the illustrated example, the tab comprising articles in the "politically liberal" category 212 and the tab comprising articles in the "politically conservative" category 214 are displayed and articles are ordered according to how many posts from "politically liberal" blogs, for example contain hyperlinks pointing to an article. The posts from "politically conservative" blogs, for example, that relate to those articles are also displayed. It will also be appreciated that the categories displayed may be a function of some predetermined criteria and may be altered by user input (e.g., a user selects different categories). A user may gain further insight into the social context surrounding the article (e.g., besides knowing how many people are discussing the article in posts) from the small boxes 210, illustrating an article's assessment. In the illustrated example, the emotional charge in the blog posts' discussion of the article is represented by the small boxes 210 (e.g., the more boxes, the more emotionally charged the article is). From these small boxes, a user may gain context about how people concerned with a particular topic are responding to an article.

A user may focus on the indicator box 208 and the titles of the posts related to the article may be displayed in a separate field 216, as illustrated in FIG. 3. Additionally, small indicator boxes 218 may represent a post's assessment. In the illustrated example, the user focused on the "5" 220 in the tab comprising articles in the "politically conservative" category 214 and the five posts (e.g., from politically conservative blogs) that have a hyperlink associated with that article (e.g., that have a hyperlink that has been updated with that article's identification tag) are displayed. A user may select a post's title and the post associated with that title will be presented to the user. It will be appreciated that the small boxes 210 presented in this illustration may illustrate any assessment (e.g., not just emotional charge). It will also be appreciated that something other than a small box may be used to represent an article and/or a post's assessment.

Figure 4:
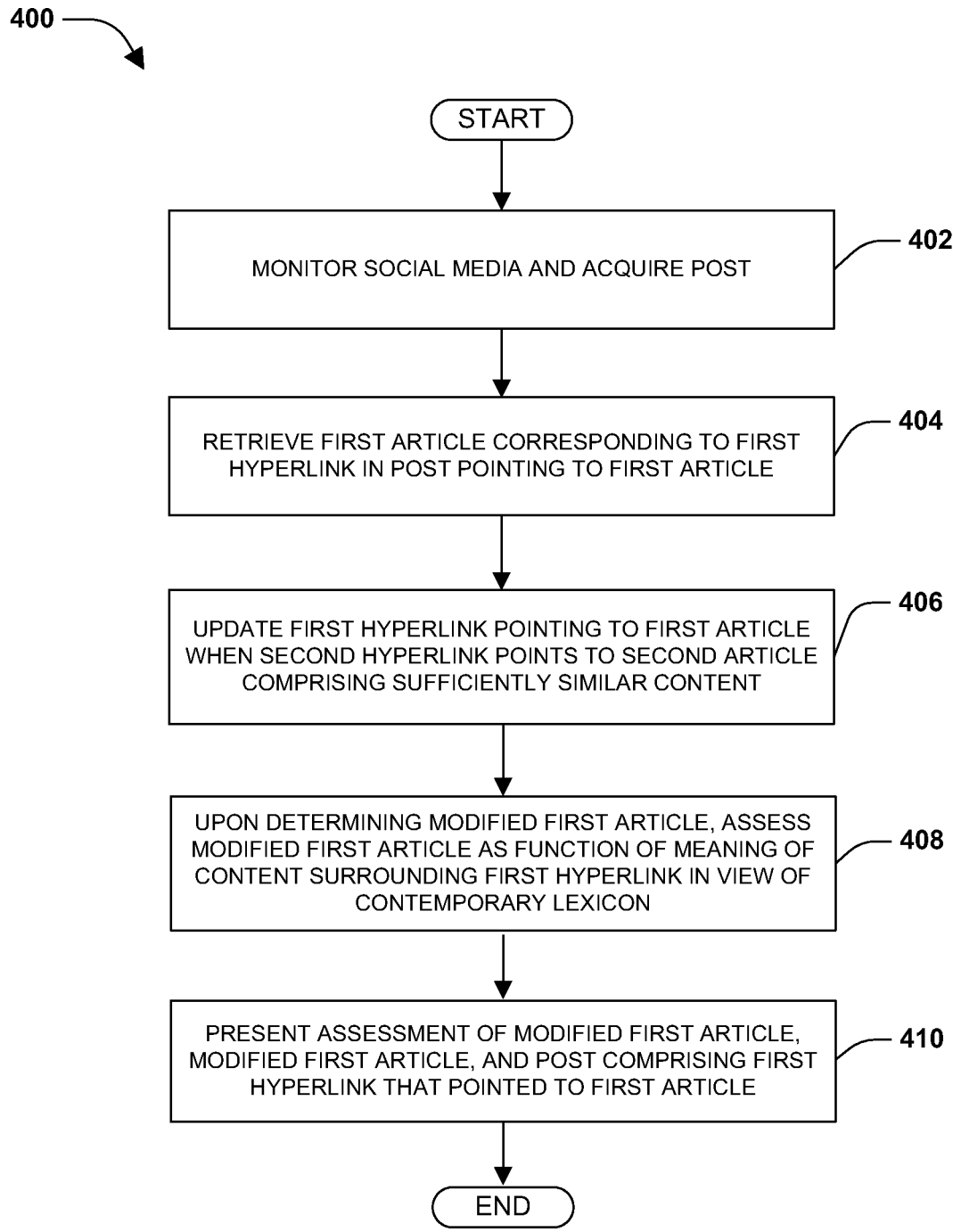
FIG. 4 is a flow chart illustrating an exemplary method of assessing an article.

Turning to FIG. 4, an exemplary methodology 400 is illustrated for making an assessment of an article. In one example, an article can be a news story and blog posts can provide information such as: how popular the article is, who is linking to it, and how people feel about the article. This information may be presented to a user so that the user may make a more informed selection concerning which article to read. At 402, social media is monitored and a post is acquired and stored (e.g., in a storage component, such as a database). The social media may include, for example, weblogs, usenet, microblogs, and message board forums. The monitoring may be limited to a segment of the social media as a function of a predetermined topic (conservative issues, liberal issues, sports news, new car releases, celebrity gossip, etc.) of interest (e.g., where a whitelist may be used to define what social media is monitored). Additionally, the social media acquired may be limited to those that comprise hyperlinks pointing to category-related sites (e.g., the category-related sites are contained on a whitelist). In one example, ping servers are monitored and feeds are crawled in response to ping events. For posts that do not provide regular pings, scheduled crawling may be performed. Partial feeds may be augmented with an intelligent scraping mechanism, for example, which parses the structure of the permalink page, extracting the complete content of the post. HTML tags may be removed and hyperlinks replaced with placeholders (e.g., numbered URL markers) corresponding to their respective hyperlink. The hyperlinks are classified as either pointing to a site containing an article or some other social media. The information acquired (e.g., the title of the post, permalink URL of the post, a timestamp related to when the post was posted, the hyperlinks, and the post, including any placeholders) is stored for later retrieval (e.g., in a storage component, such as a database).

At 404, a first article corresponding to a first hyperlink in the post that points to a site is retrieved. If the URL of the first hyperlink matches a URL of a previously retrieved article, the first article is not retrieved a second time. It will be appreciated that the URL from a previously retrieved article may be stored for a predetermined period of time (e.g., after the predetermined period of time has expired, the URL will be deleted and the article on the corresponding page will have to be retrieved if a new post contains the same URL). If the first article was previously extracted and stored, the first hyperlink may get updated with an identification tag already assigned to the stored first article. Multiple posts using the same hyperlink may create a many-to-one relationship between an article and hyperlinks. In one example, the full text of the page (e.g., the article, copyrights, headers, etc.) is retrieved and reduced to the article using a Hidden Markov Model based text segmentation algorithm, or other algorithms based on pattern recognition in a page's HTML markup. For example, term sequences of a minimum length (e.g., sequences of 10 terms or more) may be grouped (e.g., to avoid eliminating terms that may be common independently of whether they correspond to the article or the full text of the page) and compared to other pages from the same site. Those terms that are not found on many other pages are determined to be the article. Additionally, the first article is assigned some identification tag, and the first hyperlink may get updated with this identification tag.

At 406, the first article is compared to previously stored articles, and the first hyperlink is updated to point to the second article if the first article and the second article are sufficiently similar in content. In one example, a first hyperlink and a second hyperlink may point to different articles that have been slightly modified from an original, syndicated article. If a threshold (e.g., 85%) of the terms appears in both a first article and second article, those articles are considered to have sufficiently similar content. Additionally, articles are sufficiently similar in content if the longest term sequence (e.g., words in a row) common among the first and second article exceeds some threshold. The first hyperlink is then updated to correspond to the identification tag already assigned to the second article. In one example, multiple posts referring to the similar content, despite having different URLs, may create a many-to-one relationship between an article and posts' hyperlinks (e.g., having many posts connected to a single article's content). It will be appreciated that in this disclosure, the second article is also termed a modified first article if a second article is detected as being sufficiently similar in content and a first article is termed a modified first article if a second article does not contain sufficiently similar content and/or a second article containing sufficiently similar content is not found prior to the article being assessed at 408.

At 408, upon determining a modified first article, the modified first article is assessed (e.g., according to some criteria) as a function of meaning of content surrounding the first hyperlink in view of contemporarily lexicon or generally understood vernacular of the day. That is, the meaning of the words and language surrounding the hyperlink at the time they are used (e.g., fifteenth century (old English) is very different than modern/contemporary English). It will be appreciated that the term "meaning" is used in a broad sense herein to describe or comprise, among other things, a level of context that a term connotes in present language and/or a definition of a term (e.g., the assessment may include, but does not require, a cognitive step). In one example, an emotional charge of the modified first article is assessed. To assess an article, a number of terms (e.g., 30) in the post before and/or after the first hyperlink's placeholder are extracted and processed by an annotator, for example, to provide context for assessing the article. A Maximum Entropy classifier (e.g., or any other type of annotator), for example, may be trained to learn which terms signify more emotional charge. The classifier may, for example, produce binary output (e.g., 0 for non-emotional and 1 for emotional) and a confidence score corresponding to the terms assessed. Once the terms are given an assessment, the modified first article is assessed as a function of the terms' assessment. For example, if the terms are assessed as being extremely emotionally charged, the discussion of the article in the post will be assessed as being extremely emotionally charged. If multiple hyperlinks point to the same modified first article, the article's assessment is an aggregate of the terms' assessment from multiple posts. For example, if an article had a score of 4 based on the assessment of terms' from one post, and another post is created corresponding to that article and is given a score of 2, the article's score may be reduced for 3, for example. In one example, aggregate scores are stored for a number of different time spans (e.g., 1, 3, 7, 14 days to ensure that changes over time are reflected in the classification) and categories to improve performance. If a previous post is sufficiently similar in content and/or points to the same URL, the previous post will not be reevaluated again (e.g., only the article and the new post will be evaluated).

At 410, an assessment of the modified first article, the modified first article, and the post comprising the first hyperlink that pointed to the first article are presented. It will be appreciated that multiple posts may be presented where multiple hyperlinks point to the modified first article. A web service, for example, may provide methods for retrieving stored information (e.g., the most linked-to articles, the most linked-to articles that contain a given term, etc.) that is presented to a user. The web service may also store particular information that is commonly requested but does not change frequently, for example, to prevent excessive loads on a storage component. The information may be presented according to some predetermined criteria and the user may alter the information presented (e.g., by inputting a term, selecting a different category, etc.). In one example, the title of an article may be displayed more prominently, with the post comprising the first hyperlink that pointed to the first article represented by a number in an indicator box and the assessment represented by a glow surrounding the indicator box. Additionally, where multiple hyperlinks point to the modified first article, the multiple posts are represented by a number in an indicator box (e.g., a "5" if five blog posts contain a hyperlink to the modified first article), for example. The user may select the title of an article, for example, and the article will be presented. Additionally, the user may focus on the number in the indicator box and the titles of the post(s) related to that article will be presented, along with the assessment of the post(s). The user may select the title of the post, for example, and the post may be displayed. It will also be appreciated that multiple categories, related to the same article, may be displayed concurrently. Additionally, the categories displayed are a function of some predetermined criteria and may be altered by user input, for example. For example, if an article is linked-to by "politically liberal" blogs, but also by "politically conservative" blogs, the blog posts related to both categories may be displayed.

Figure 5:
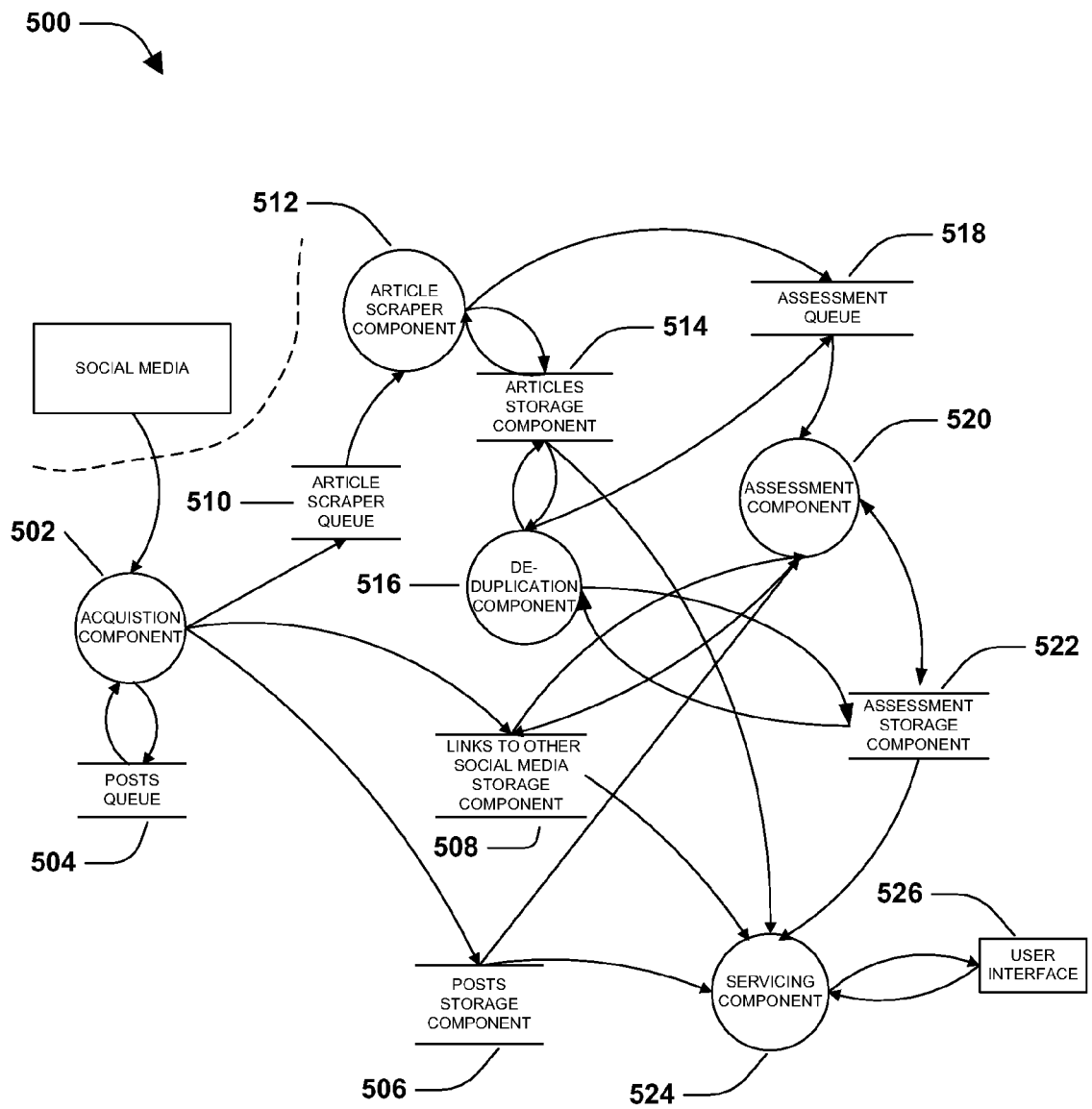
FIG. 5 is a component block diagram illustrating an exemplary system for assessing an article.

FIG. 5 is a schematic block diagram of an exemplary system 500 configured to make an assessment of an article. The system comprises a an acquisition component 502 configured to acquire posts; a posts queue 504 configured to store posts during burst of traffic; a posts storage component 506 configured to store posts; a links to other social media storage component 508 configured to store links to other social media in posts; an article scraper queue 510 configured to store site links in posts; an article scraper component 512 configured to retrieve articles and extract salient article text; an article storage component 514; a de-duplication component 516 configured to detect articles that are sufficiently similar in content; an assessment queue 518 configured to store identification tags corresponding to a first article and/or store an identification tag corresponding to a second article comprising content that is sufficiently similar to the first article; an assessment component 520 configured to create an assessment of the article as a function of meaning of the content surrounding a hyperlink pointing to the article in the post in view of contemporary lexicon; an assessment storage component 522 configured to store the assessment; a service component 524 configured to allow the stored post, links to other social media, the article, and the assessment to be retrieved; and a user interface 526 configured to present articles and present an assessment of the article.

The acquisition component 502 acquires posts from social media (e.g., a weblog, usenet, microblogs, message board, etc.). The posts acquired may be limited by specifying (e.g., on a whitelist) which social media to acquire posts from. Additionally, the post acquired may be limited to those comprising a hyperlink to a particular site or sites (e.g., specified on a whitelist) that commonly contain articles related to a particular topic or category (e.g., of blogs). In one example, posts are acquired if they are on a politically liberal blog and comprise a hyperlink to a news site. The acquisition component 502 may, for example, use syndicated feed crawlers to extract posts from social media. If the feed crawler extracts a portion of the post, an intelligent scraping mechanism, which might parse the structure of the permalink, may extract the complete content of the post. Once the post is extracted, the acquisition component 502 extracts hyperlinks in the post, replaces the hyperlinks with placeholders (e.g., numbered URL markers) and removes HTML tags. The post (e.g., the title, permalink URL of the post, a timestamp related to when the post was posted, body of the post including placeholders, etc.) is stored in the posts storage component 506. Extracted hyperlinks are classified as pointing to other social media or a site containing an article. After hyperlinks are classified, the hyperlinks pointing to other social media are stored in the links to other social media storage component 508 and hyperlinks pointing to a site are sent to the article scraper queue 510. Additionally, the posts queue 504 (e.g., an in-memory queue) may be utilized to store acquired posts where the acquisition component 502 is unable to extract information rapidly enough due to burst in traffic.

A first hyperlink sent to the article scraper queue 510 is forwarded to the article scraper component 512. The article scraper component 512 determines if an article has already been retrieved by comparing the first hyperlink with URLs corresponding to articles in the articles storage component 514. If the first hyperlink matches a URL corresponding to an article in the articles storage component 514, the first hyperlink is assigned an identification tag corresponding to the article with the URL matching the first hyperlink. If the first hyperlink does not match a URL corresponding to an article in the article storage component 514, a first article is retrieved from the site pointed to by the first hyperlink. In one example, the full text (e.g., the article, navigation, headers, copyrights, etc.) of an HTML page pointed to by the first hyperlink may be extracted and segmented (e.g., using a Hidden Markov Model based text segmentation algorithm, or other algorithms based on pattern recognition in a page's HTML markup). If the full text is extracted, the texts of multiple pages from a single site are compared for terms that appear frequently (e.g., in more than 50 pages). To avoid terms that may appear frequently regardless of whether they correspond to the article or other portions of the full text, a minimum number of terms (e.g., 10 terms) may be grouped before being compared. Terms that appear frequently across pages may be separated from the remaining portion of the text, for example, and stored (e.g., in main memory) to expedite the removal of frequent terms from future full text pages extracted from the same site. In one example, frequent terms may be stored for a period of time and then discarded to ensure that changes in the site's copyright text, for example, are detected.

Once the first article is retrieved by the article scraper component 512, the article is assigned an identification tag and the first hyperlink is updated with the identification tag. The article is sent to the article storage component 514 and the identification tag is sent to the assessment queue 518.

The de-duplication component 516 receives the first article from the article storage component 514 and compares the first article with other articles in the article storage component 514. If a threshold of terms (e.g., 85% of the terms in first article) appears in a second article already in the article storage component 514 and/or the largest sequence of terms (e.g., words in a row) in common among two articles exceeds some threshold, the de-duplication component 516 determines that the first article and second article are sufficiently similar in content (e.g., a single article that was syndicated to many sites, which modified the article slightly and reposted it under a different URL). If the first article and second article are duplicates, the de-duplication component 516 updates the first hyperlink with the identification tag assigned to the second article, and the identification tag corresponding to the second article is placed in the assessment queue 518.

The assessment component 520 receives the identification tag (e.g., of the first article or the second article if the de-duplication component 516 determines the first article is a duplicate) from the assessment queue 518 and assesses it according to some predetermined criteria (e.g., emotional charge, objectiveness, etc) as a function of content surrounding the hyperlink that points to the article. The assessment component 520 retrieves the post comprising the first hyperlink (e.g., and updates with the identification tag). It will be appreciated that links to other social media may also be retrieved and used in the assessment process. Once the assessment component has retrieved the post comprising the first hyperlink, the article is assessed with a function mapping the words in the context surrounding the hyperlink to a predicted emotional charge. Stated another way, the article is assessed as a function of meaning of content surrounding the first hyperlink in view of contemporary lexicon or generally understood vernacular of the day. That is, the meaning of the words and/or language surrounding the hyperlink at the time they are used (e.g., fifteenth century (old English) is very different than modern/contemporary English). It will be appreciated that the term "meaning" is used in a broad sense herein to describe or comprise, among other things, a level of context that a term connotes in present language and/or a definition of a term (e.g., the assessment may include, but does not require, a cognitive step). For example, vulgar language in a post may show a higher emotional charge than more neutral language. In one example, the assessment component 520 extracts a particular number of terms (e.g., 30) before and after the placeholder for the first hyperlink and assesses the article based upon the terms extracted. In one example, the assessment component 520 may be a Maximum Entropy classifier which produces binary output and a confidence score. However, some other assessment component 520 may be used and does not have to produce binary output and/or a confidence score. By assessing the terms surrounding the first hyperlink, the post, as it relates to the article, and the article is assessed. Where an article is previously assessed (e.g., as a result of another post comprising a hyperlink to the article) the score of the primary article is aggregated as a function of the new post. Any prior posts related to the article are not reevaluated. In one example, aggregate statistics take into account both the binary output and the confidence score and normalize the classification based on the number of posts comprising hyperlinks that point to articles that are sufficiently similar in content. Aggregate scores may be computed and stored for a number of different time spans (e.g., 1, 3, 7, 14 days to ensure that changes over time are reflected in the classification) and categories to improve performance, for example. The assessment of the post and article are stored in an assessment storage component 522. It will also be appreciated that article scraper component 512 and the de-duplication component 516 may act independently from one another.

If the two components 512, 516 act independently, and de-duplication component 516 determines that one article is a duplicate of another, the de-duplication component 516 retrieves that assessment of the first article from the assessment storage component 522, aggregates the assessment of the second article by combining the assessments of the contexts around the links leading to both the first and the second article, removes the first article's assessment from the assessment storage component, and stores the new aggregate assessment of the second article for each of the supported time spans. The duplicate articles are therefore mapped to the primary article and all further aggregate assessments are computed and stored for that article.

The service component 524 allows information stored in the posts storage component 506, links to other social media storage component 508, article storage component 514 and the assessment storage component 522 to be retrieved. For example, the service component 524 might expose methods for retrieving the most linked-to articles, the most linked-to articles that comprise a given keyword, or posts links for a given article from the storage components 506, 508, 514, and/or 522. Additionally, the service component 524 may store information that is commonly requested but does not change frequently, for example, to prevent excessive load on the storage components 506, 508, 514, and/or 522.

The user interface 526 presents a user with information retrieved through the service component 524. The information presented is a function of some predetermined criteria and/or a function of some user input. A user may enter a keyword and articles containing or related to that keyword are displayed, for example. In one example, the title of the article, the assessment, and an indicator box representing the number of posts comprising hyperlinks to the article are displayed. If the user desires to read an article, the user may select the title of the article and the article is displayed, for example. Additionally, the user may focus on the indicator box and the titles of posts that comprise hyperlinks to the article (e.g., and the assessment of posts) are presented. Where the title of a post is displayed, the user may select the title and the corresponding post is displayed. It will be appreciated that where one or more articles are unable to be presented (e.g., because of display limitations), the articles presented may have a higher figure of merit relative to other articles. Additionally, the user may alter an article's figure of merit (e.g., by selecting a different category, typing in a keyword, etc.). It will also be appreciated that the assessment may be represented by small squares, glowing bars, or some other visualization. In one example, the classification used is emotional charge (e.g., the more emotionally charged an article is, the more the indicator box will glow). Furthermore, multiple categories, related to the same article, may be displayed concurrently. For example, if an article is linked-to by both "politically liberal" blogs and "politically conservative" blogs, the blog posts in both categories may be displayed.

Figure 6:
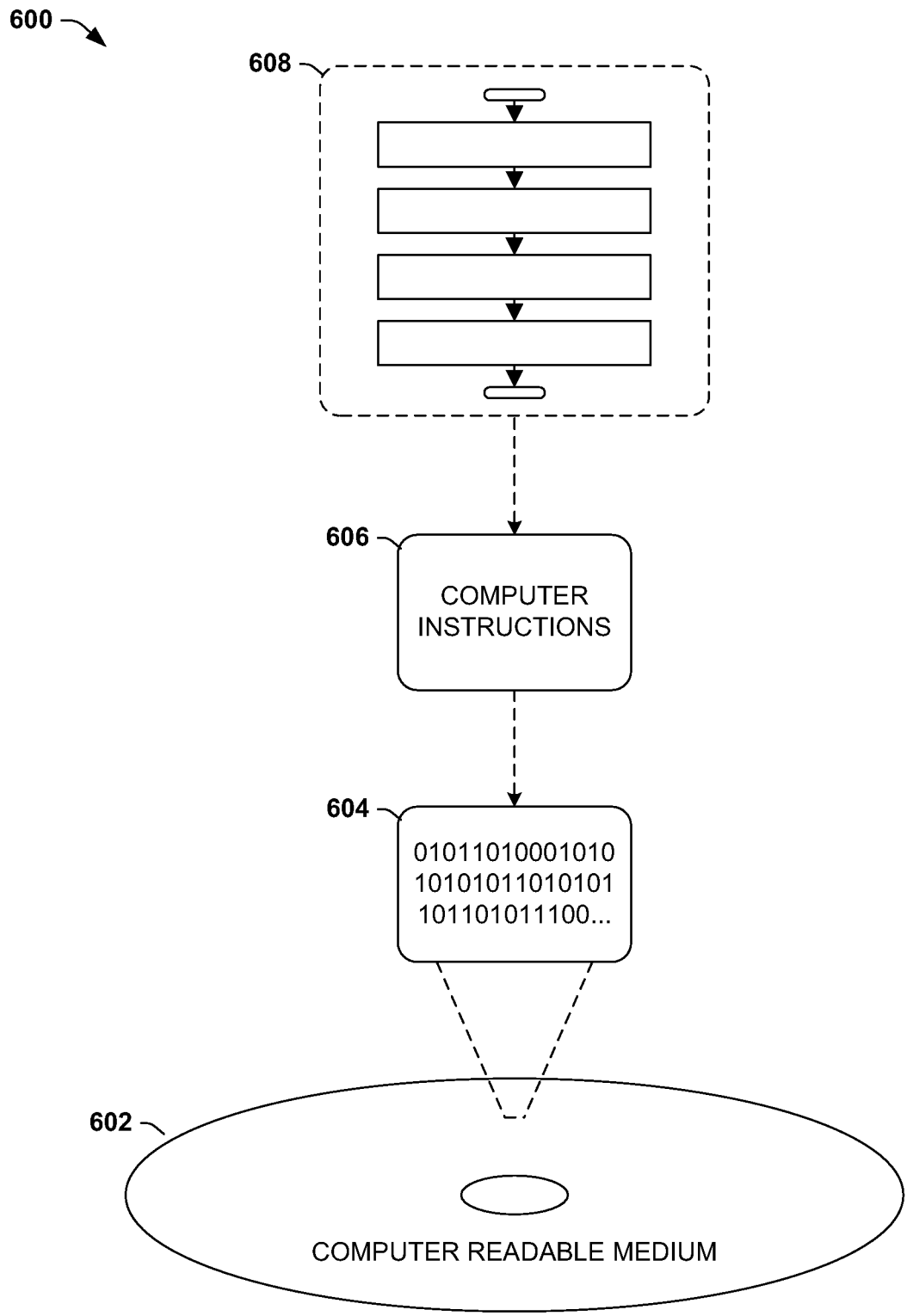
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to one or more of the principles set forth herein. In one such embodiment 600, the processor-executable instructions 606 may be configured to perform a method, such as the exemplary methods 100 and 400 of FIGS. 1 and 4, for example. In another such embodiment, the processor-executable instructions 606 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
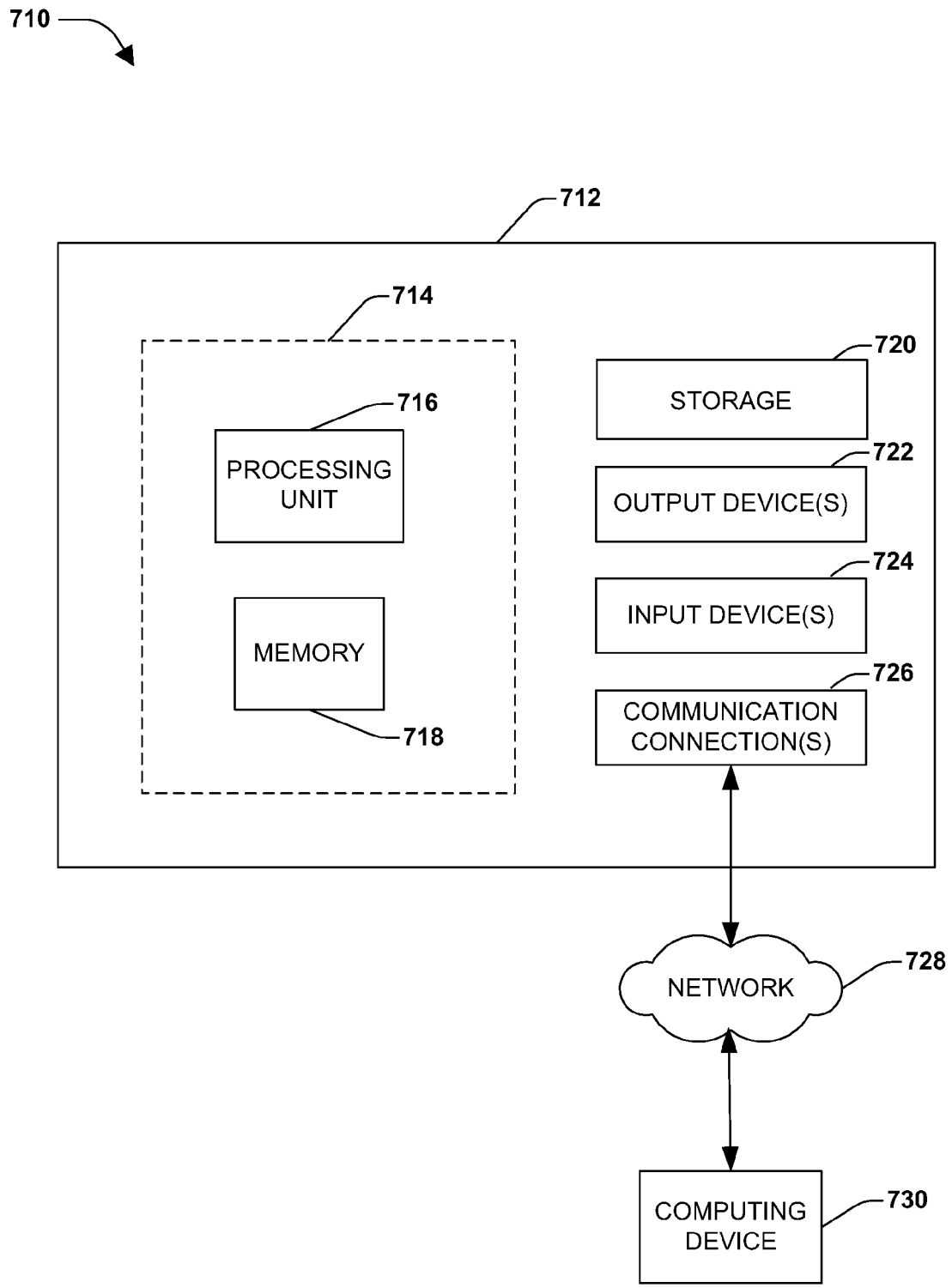
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for assessing an emotional sentiment related to a topic, comprising:
   identifying first social media content comprising a first link to a first article associated with the topic;
   assessing an emotional sentiment related to the first article as a function of one or more terms in the first social media content;
   identifying second social media content comprising a second link to a second article associated with the topic and comprising content similar to the first article, the second article comprising content similar to the first article when $S(a_i,a_j)/\text{size}(a_i)$ exceeds a predetermined threshold where $S(a_i,a_j)$ is a number of terms of a largest set of infrequent terms between the first article ($a_i$) and the second article ($a_j$) and size ($a_i$) is the number of terms in the larger of articles $a_i$ and $a_j$;
   assessing an emotional sentiment related to the second article as a function of one or more terms in the second social media content; and
   aggregating the emotional sentiment related to the first article with the emotional sentiment related to the second article to assess the emotional sentiment related to the topic,
   at least some of the method implemented at least in part via a processing unit.

2. The method of claim 1, comprising providing for display in a user interface at least one of:
   a first graphical representation of the emotional sentiment related to the first article;
   a second graphical representation of the emotional sentiment related to the second article; or
   a third graphical representation of the emotional sentiment related to the topic.

3. The method of claim 1, the assessing an emotional sentiment related to the first article comprising:
   assessing an emotional sentiment related to the first article as a function of a specified number of terms adjacent the first link.

4. The method of claim 1, comprising:
   replacing the first link with a placeholder.

5. The method of claim 1, comprising:
   replacing the first link with the second link.

6. The method of claim 1, the second article comprising content similar to the first article when a fraction of words in $W(a_i)$ that are covered by at least one set of term sequences that occur in both the first article $a_i$ and the second article $a_j$ exceeds a predetermined threshold, where $W(a_i)$ is a substring of all terms in the first article $a_i$ not covered by frequent terms.

7. The method of claim 1, comprising acquiring the first social media content from a syndicated feed crawler that crawls a social media platform.

8. The method of claim 1, the first social media content comprising at least one of a blog posting, microblog posting, weblog posting, usenet posting, or message board posting.

9. The method of claim 1, the first article comprising a news article.

10. A system for assessing an emotional sentiment related to a topic, comprising:
    one or more processing units; and
    memory comprising instructions that when executed by at least some of the one or more processing units perform operations, comprising:
       identifying first social media content comprising a first link to a first article associated with the topic;
       assessing an emotional sentiment related to the first article as a function of one or more terms in the first social media content;
       identifying second social media content comprising a second link to a second article associated with the topic and comprising content similar to the first article, the second article comprising content similar to the first article when $S(a_i,a_j)/\text{size}(a_i)$ exceeds a predetermined threshold, where $S(a_i,a_j)$ is a number of terms of a largest set of infrequent terms between the first article ($a_i$) and the second article ($a_j$) and size ($a_i$) is the number of terms in the larger of articles $a_i$ and $a_j$;
       assessing an emotional sentiment related to the second article as a function of one or more terms in the second social media content; and
       aggregating the emotional sentiment related to the first article with the emotional sentiment related to the second article to assess the emotional sentiment related to the topic.

11. The system of claim 10, the operations comprising:
    replacing the first link with the second link.

12. The system of claim 10, the second article comprising content similar to the first article when a fraction of words in $W(a_i)$ that are covered by at least one set of term sequences that occur in both the first article $a_i$ and the second article $a_j$ exceeds a predetermined threshold, where $W(a_i)$ is a substring of all terms in the first article $a_i$ not covered by frequent terms.

13. A computer readable storage device comprising computer executable instructions that when executed perform a method for assessing an emotional sentiment related to a topic, comprising:
    identifying first social media content comprising a first link to a first article associated with the topic;
    assessing an emotional sentiment related to the first article as a function of one or more terms in the first social media content;
    identifying second social media content comprising a second link to a second article associated with the topic and comprising content similar to the first article, the second article comprising content similar to the first article when $S(a_i,a_j)/\text{size}(a_i)$ exceeds a predetermined threshold, where $S(a_i,a_j)$ is a number of terms of a largest set of infrequent terms between the first article ($a_i$) and the second article ($a_j$) and size ($a_i$) is the number of terms in the larger of articles $a_i$ and $a_j$;
    assessing an emotional sentiment related to the second article as a function of one or more terms in the second social media content; and
    aggregating the emotional sentiment related to the first article with the emotional sentiment related to the second article to assess the emotional sentiment related to the topic.

14. The computer readable storage device of claim 13, the assessing an emotional sentiment related to the first article comprising:
    assessing the emotional sentiment related to the first article via a maximum entropy classifier configured to output a binary output indicative of the emotional sentiment related to the first article and a confidence score indicative of a confidence of the binary output.

15. The computer readable storage device of claim 13, the first social media content comprising at least one of a blog posting, microblog posting, weblog posting, usenet posting, or message board posting.

16. The computer readable storage device of claim 13, the method comprising:

replacing the first link with the second link.

17. The computer readable storage device of claim 13, the second article comprising content similar to the first article when a fraction of words in $W(a_i)$ that are covered by at least one set of term sequences that occur in both the first article $a_i$ and the second article $a_j$ exceeds a predetermined threshold, where $W(a_i)$ is a substring of all terms in the first article $a_i$ not covered by frequent terms.

18. The computer readable storage device of claim 13, the method comprising providing for display in a user interface at least one of:

a first graphical representation of the emotional sentiment related to the first article;

a second graphical representation of the emotional sentiment related to the second article; or a third graphical representation of the emotional sentiment related to the topic.

19. The computer readable storage device of claim 13, the method comprising:

providing for display in a user interface a graphical representation of the emotional sentiment related to the topic;

detecting user interaction with the graphical representation; and displaying at least one of the first social media content, the second social media content, the first article, or the second article responsive to the detecting.

20. The computer readable storage device of claim 13, the method comprising:

acquiring the first social media content from a syndicated feed crawler that crawls a social media platform.

\* \* \* \* \*